United States Patent
Farah et al.

(10) Patent No.: US 10,364,690 B2
(45) Date of Patent: Jul. 30, 2019

(54) STATOR VANE ASSEMBLY AND METHOD THEREFOR

(71) Applicant: United Technologies Corporation, Hartford, CT (US)

(72) Inventors: Jorge I. Farah, Hartford, CT (US); Jonathan P. Burt, Sturbridge, MA (US); Thomas J. Praisner, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 440 days.

(21) Appl. No.: 14/766,178

(22) PCT Filed: Jan. 28, 2014

(86) PCT No.: PCT/US2014/013276
§ 371 (c)(1),
(2) Date: Aug. 6, 2015

(87) PCT Pub. No.: WO2014/130214
PCT Pub. Date: Aug. 28, 2014

(65) Prior Publication Data
US 2015/0377048 A1 Dec. 31, 2015

Related U.S. Application Data

(60) Provisional application No. 61/767,870, filed on Feb. 22, 2013.

(51) Int. Cl.
*F01D 9/04* (2006.01)
*F01D 25/16* (2006.01)
*F02C 7/20* (2006.01)

(52) U.S. Cl.
CPC ........... *F01D 9/047* (2013.01); *F01D 25/162* (2013.01); *F02C 7/20* (2013.01); *F05D 2230/23* (2013.01);
(Continued)

(58) Field of Classification Search
CPC . F01D 9/02; F01D 9/041; F01D 9/044; F01D 9/047; F01D 11/005
See application file for complete search history.

(56) References Cited

U.S. PATENT DOCUMENTS 4,135,857 A * 1/1979 Pannone ................. F01D 5/143
416/193 A
6,579,061 B1 * 6/2003 Heyward ................ F01D 5/143
29/889.22

(Continued)

OTHER PUBLICATIONS

International Preliminary Report on Patentability for PCT Application No. PCT/US2014/013276 dated Sep. 3, 2015.
(Continued)

*Primary Examiner* — David E Sosnowski
*Assistant Examiner* — Eric L Zamora Alvarez
(74) *Attorney, Agent, or Firm* — Carlson, Gaskey & Olds, P.C.

(57) ABSTRACT

A stator vane assembly includes a plurality of distinct vane segments that each respectively include a first platform, a second platform and at least one vane airfoil connected at opposed ends thereof to the first platform and the second platform. The first platforms meet at distinct first joints with each other, and the second platforms meet at distinct second joints with each other such that the plurality of vane segments forms an annular structure.

18 Claims, 3 Drawing Sheets

(52) U.S. Cl.
CPC ...... *F05D 2240/12* (2013.01); *F05D 2240/80* (2013.01)

(56) References Cited

U.S. PATENT DOCUMENTS

| | | | |
|---|---|---|---|
| 7,114,920 B2* | 10/2006 | Synnott | F01D 9/02 415/139 |
| 7,195,454 B2* | 3/2007 | Lu | F01D 5/143 415/181 |
| 7,217,096 B2* | 5/2007 | Lee | F01D 5/143 416/223 A |
| 2002/0044868 A1 | 4/2002 | Marx et al. | |
| 2005/0254944 A1 | 11/2005 | Bash et al. | |
| 2009/0274562 A1 | 11/2009 | Minor et al. | |
| 2012/0148383 A1* | 6/2012 | Gear | F01D 5/187 415/115 |
| 2012/0275922 A1 | 11/2012 | Praisner et al. | |
| 2013/0011265 A1 | 1/2013 | Miller et al. | |
| 2013/0202427 A1* | 8/2013 | Macelroy | F01D 9/04 415/208.1 |

OTHER PUBLICATIONS

Reid, K. 2006. Reducing the Performance Penalty Due to Turbine Inter-Platform Gaps. Proceedings of GT2006 ASME Turbo Expo 2006: Power for Land, Sea and Air. May 8-11, 2006. GT2006-90839. ASME, Barcelona, Spain.
The International Search Report and Written Opinion for PCT Application No. PCT/US2014/013276, dated May 20, 2014.

* cited by examiner

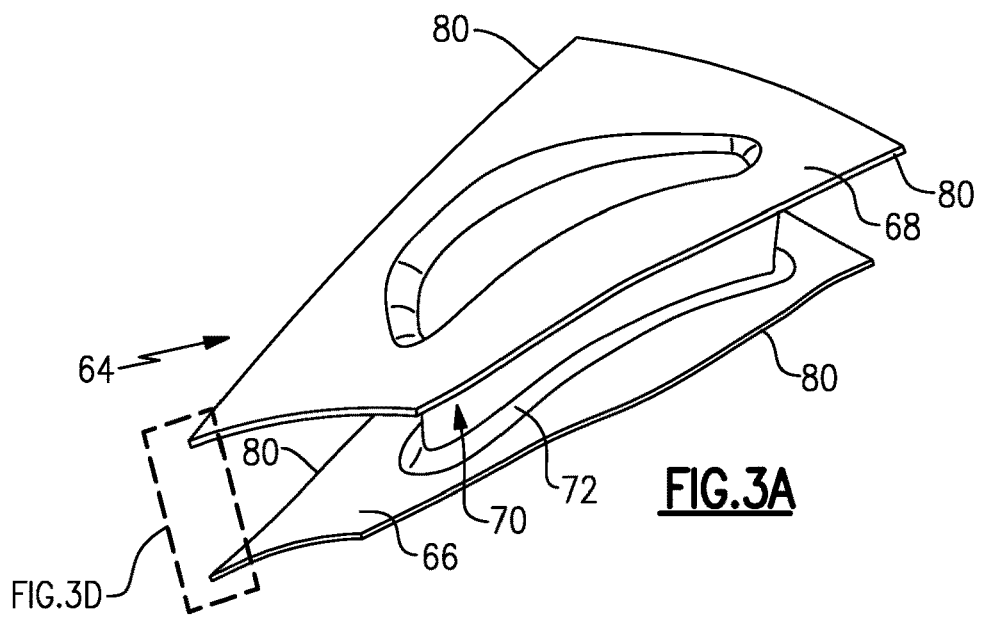
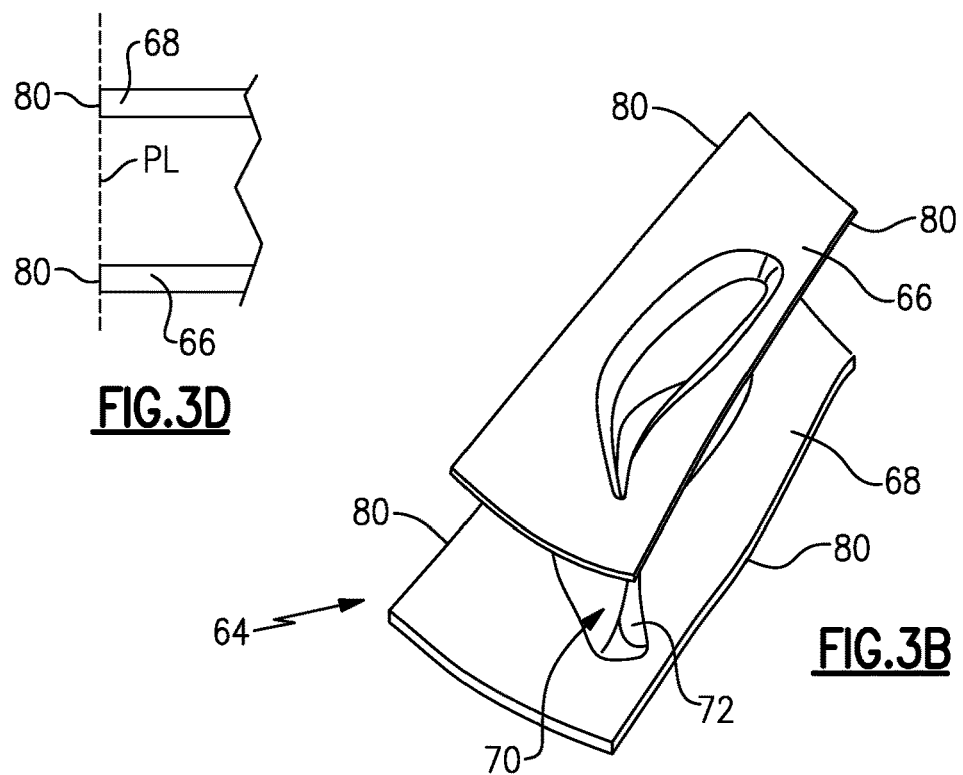

STATOR VANE ASSEMBLY AND METHOD THEREFOR

BACKGROUND

A gas turbine engine typically includes a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor. Gas turbine engines installed on aircraft can include a fan section driven by the turbine section to provide thrust. Ground-based industrial gas turbine engines typically drive a generator through a shaft.

The turbine section includes turbine vanes that orient the gas flow in a desired direction. The turbine vanes are secured to an outer static engine structure such that aerodynamic loads on the vanes transfer to the static engine structure.

SUMMARY

A stator vane assembly according to an exemplary aspect of the present disclosure includes a plurality of distinct vane segments each respectively includes a first platform, a second platform and at least one vane airfoil connected at opposed ends thereof to the first platform and the second platform. The first platforms meet at distinct first joints with each other and the second platforms meet at distinct second joints with each other such that the plurality of vane segments form an annular structure.

In a further non-limiting embodiment of any of the foregoing examples, the distinct first joints and the distinct second joints include surface discontinuities.

In a further non-limiting embodiment of any of the foregoing examples, the distinct first joints and the distinct second joints are bonded joints.

In a further non-limiting embodiment of any of the foregoing examples, the distinct first joints run parallel to a line that is tangent to a leading edge fillet and a trailing edge fillet on a pressure side of the at least one vane airfoil.

In a further non-limiting embodiment of any of the foregoing examples, each of the distinct first joints extends between neighboring ones of the vane airfoils, and at two points that are respectively nearest to the neighboring ones of the vane airfoils, the distinct first joint is closer to a pressure side of one of the neighboring vane airfoils than to a suction side of the other of the neighboring vane airfoils.

In a further non-limiting embodiment of any of the foregoing examples, the first platform has a first circumferential side and the second platform has a second circumferential side that is coplanar with the first circumferential side.

In a further non-limiting embodiment of any of the foregoing examples, between neighboring ones of the vane airfoils there is a boundary where a first flow field defined around one of the neighboring vane airfoils meets a second flow field defined around the other of the neighboring vane airfoils, and one of the distinct first joints is located between the neighboring vane airfoils such that it does not breach the boundary.

In a further non-limiting embodiment of any of the foregoing examples, the distinct first joints are straight.

In a further non-limiting embodiment of any of the foregoing examples, each of the distinct first joints is situated in a linear band between neighboring ones of the vane airfoils.

In a further non-limiting embodiment of any of the foregoing examples, the distinct first joints and the distinct second joints are metallurgical joints.

A gas turbine engine according to an exemplary aspect of the present disclosure includes, optionally, a fan, a compressor section, combustor in fluid communication with the compressor section, and a turbine section in fluid communication with the combustor. The turbine section, the compressor section or both includes a stator vane assembly having a plurality of distinct vane segments each respectively includes a first platform, a second platform and at least one vane airfoil connected at opposed ends thereof to the first platform and the second platform, the first platforms meeting at distinct first joints with each other and the second platforms meeting at distinct second joints with each other such that the plurality of vane segments form an annular structure.

A method for controlling aerodynamic performance of a stator vane assembly, according to an exemplary aspect of the present disclosure provides a plurality of distinct vane segments, each respectively, include a first platform, a second platform and at least one vane airfoil connected at opposed ends thereof to the first platform and the second platform. The first platforms meeting at distinct first joints with each other and the second platforms meeting at distinct second joints with each other such that the plurality of vane segments form an annular structure, situating the distinct first joints, the distinct second joints or both in locations between neighboring ones of the vane airfoils to reduce gas flow separation compared to at least one other, different location between the neighboring ones of the vane airfoils.

In a further non-limiting embodiment of any of the foregoing examples, the situating of the distinct first joints includes situating each of the distinct first joints such that it runs parallel to a line that is tangent to a leading end fillet and a trailing end fillet on a pressure side of an adjacent one of the vane airfoils.

In a further non-limiting embodiment of any of the foregoing examples, includes situating each of the distinct first joints between neighboring ones of the vane airfoils such that, at two points that are respectively nearest to the neighboring ones of the vane airfoils, the distinct first joint is closer to a pressure side of one of the neighboring vane airfoils than to a suction side of the other of the neighboring vane airfoils.

In a further non-limiting embodiment of any of the foregoing examples, includes situating each of the distinct first metallurgical joints in a linear band between neighboring ones of the vane airfoils.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 3A illustrates an example vane segment.
FIG. 3B illustrates the vane segment of FIG. 3A rotated about 180°.
FIG. 3D illustrates a portion from FIG. 3A.

DETAILED DESCRIPTION

Figure 1:
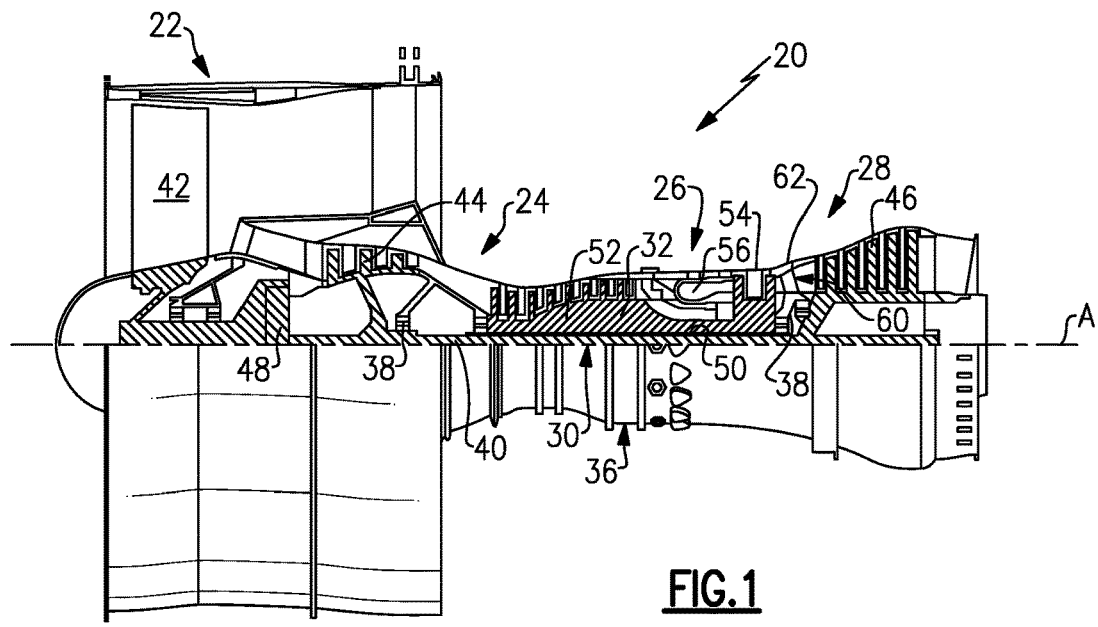
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about five (5). The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7 \, °R)]^{0.5}$. The "Low corrected fan tip speed" as disclosed herein according to one non-limiting embodiment is less than about 1150 ft/second.

As shown schematically in FIG. 1, the engine 20 also includes a stator vane assembly 60 located axially between the first turbine 46 and the second turbine 54. The stator vane assembly 60 is connected to a static case 62 such that aerodynamic loads on the stator vane assembly 60 transfer to the static case 62. Although the stator vane assembly 60 is shown and described herein with respect to the turbine section 28, the examples herein can alternatively or additionally be applied to a stator vane assembly in the compressor section 24.

Figure 2:
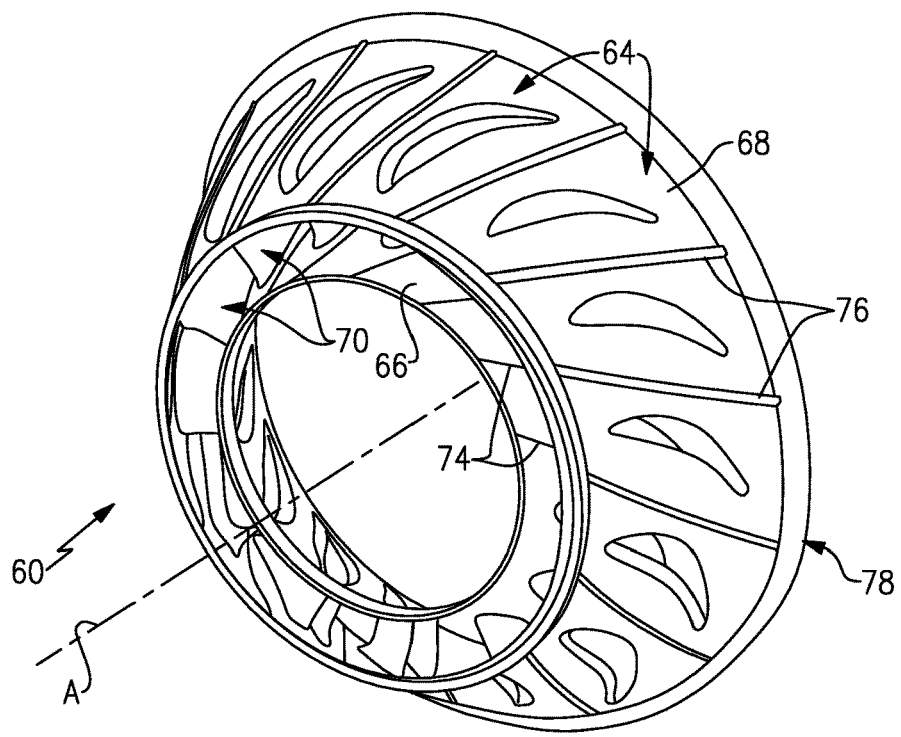
FIG. 2 illustrates an example stator vane assembly.
Figure 3C:
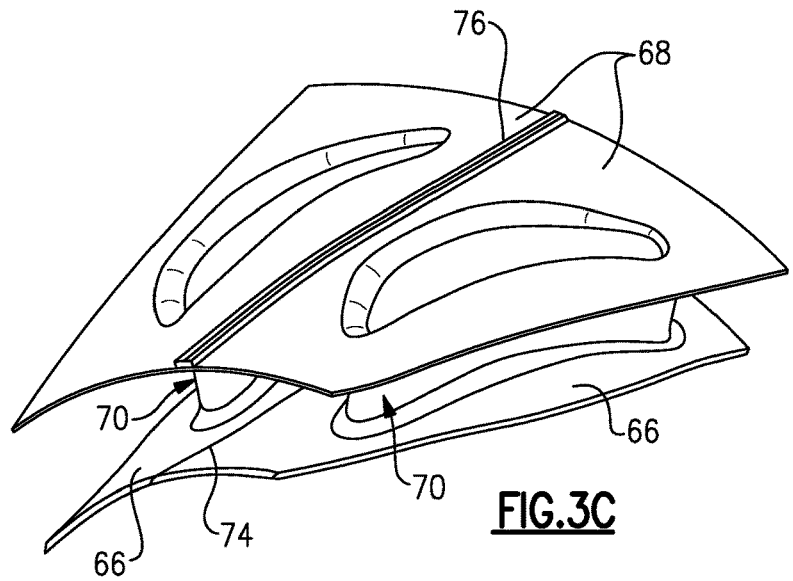
FIG. 3C illustrates two meeting vane segments.

FIG. 2 shows an isolated view of the stator vane assembly 60. The stator vane assembly 60 includes a plurality of distinct vane segments 64. FIGS. 3A and 3B show isolated views of one of the vane segments 64, and FIG. 3C shows two meeting ones of the vane segments 64. Each of the vane segments 64 includes a first platform 66, a second platform 68 and at least one vane airfoil 70 connected at opposed ends thereof to the first platform 66 and the second platform 68. In other examples, there could be two vane airfoils 70 connected at opposed ends thereof to the first platform 66 and the second platform 68 (i.e., a segment doublet) or even greater than two vane airfoils 70. In this example, the vane airfoil 70 connects to each of the first platform 66 and second platform 68 at respective fillets 72. As can also be appreciated from the drawings, the first platform 66 in this example is a radially inner platform and the second platform 68 is a radially outer platform with respect to central engine axis A.

In this example, the first platforms 66 meet at distinct first joints 74 with each other and the second platforms 68 meet at distinct second joints 76 with each other such that the vane segments 64 form an annular structure, indicated at 78, around the central engine axis A. As examples, the joints 74/76 can be bonded or fused joints, such as but not limited to weld, braze or adhesive joints, or mechanical joints. In a mechanical joint, the first platforms 66 mechanically interface with each other, and in some examples can directly abut against one another, and the second platforms 68 mechanically interface with each other, and in some examples can directly abut against one another. The interfaces can be held together using mechanical fasteners or the like. The vane segments 64 are distinct from each other and, although each vane segment 64 can be bonded to neighboring vane segments 64, each vane segment 64 can be distinguished from its neighbors by the joints 74/76. For example, if the joints 74/76 are metallurgical joints, metallurgical joints are physical discontinuities between the vane segments 64 that can be detected, such as by observation with or without magnification.

Figure 4:
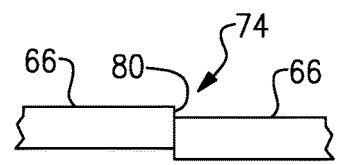
FIG. 4 illustrates a joint with a surface discontinuity.

In one example physical discontinuity, as shown in FIG. 4, due to fabrication tolerances, slight misalignments or the like, the surfaces that form the joints 74 may not perfectly align and thus a surface discontinuity 80 can result. It is to be understood that the examples herein discussed with respect to the joints 74 are equally applicable to the joints 76. Depending upon the location of the joints 74 and which one of the first platforms 66 is raised or lowered relative to the other, the surface discontinuity 80 acts as a "waterfall" or a "dam" with regard to gas flow over the first platforms 66.

The surface discontinuities 80 or other physical discontinuities can influence gas flow between the vane airfoils 70. For example, the surface discontinuities 80 or other physical discontinuities extend into the gas flow and can cause flow separation and thus debit aerodynamic performance. As will be described in further detail below, the joints 74 (and/or joints 76) can be strategically situated between the vane airfoils 70 to reduce flow separation relative to at least one other, different location between the vane airfoils 70.

Figure 5:
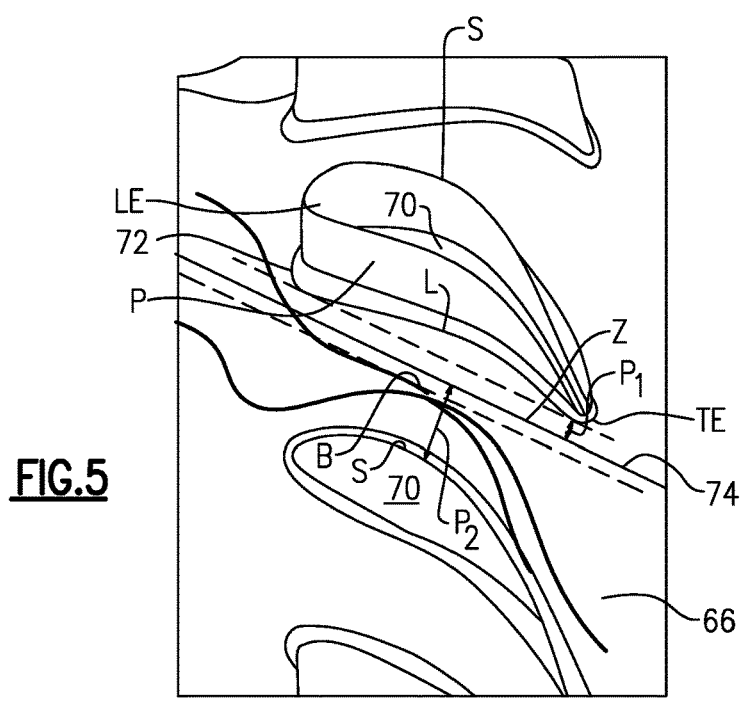
FIG. 5 illustrates neighboring vane airfoils and flow fields around the airfoils.

FIG. 5 shows a view of several neighboring ones of the vane airfoils 70 and first platforms 66 (with the second platforms 68 removed for the purpose of description), along with contour lines indicating flow fields around the vane airfoils 70. In general, the gas flow in FIG. 5 is from left-to-right such that the left side of the vane airfoils 70 is a leading end LE, the right side is a trailing end TE, the lower side is a pressure side P and the upper side is a suction side S.

Each vane airfoil 70 defines a corresponding flow field around itself. The exact shape of the flow fields will vary somewhat depending on the shape of the vane airfoils 70 and flow parameters. However, the flow fields can meet and thus define a critical boundary B along the meeting interface. At the critical boundary B, flow separation can occur because of flow from several different directions. The directionally different flows interact differently with physical discontinuities. For instance, a physical discontinuity can have the influence of a "waterfall" with respect to flow from one direction and the influence of a "dam" with respect to flow from another direction. Thus, to reduce flow separation, the joint 74 can be situated so that it does not breach the boundary B. Flow separation can be analyzed using computerized flow analysis and, given this description, the skilled person will be able to discern a reduction in flow separation between two potential locations for situating the joint 74.

In a further example, the joint 74 is designed to be within a zone Z, which is defined with regard to the critical boundary B. In this example, the zone Z is a linear band that extends between the critical boundary B and the fillet 72 of the adjacent pressure side P of the neighboring vane airfoil 70. For example, the side of the zone Z opposite from the critical boundary B can be a line L that is tangent to the fillet 72 at the leading end LE and the trailing end TE. The side of the zone facing the critical boundary B can be a predetermined distance from the line L. In one example, the joint 74 extends along the line L, but alternatively can be anywhere in the zone Z such that it does not breach the critical boundary B.

As also shown in FIG. 5, the joint 74 is situated farther toward the pressure side P of the one neighboring vane airfoil 70 than the suction side S of the other neighboring vane airfoil 70. For example, the bias in location toward the pressure side P can be represented by the closest points along the joint 74 to the pressure side P and the suction side S. In one example, the joint 74 has two points $P_1$ and $P_2$ along its length. Point $P_1$ is the point (in directions orthogonal to the joint 74) at which the joint 74 is closest to the adjacent pressure side P of the one neighboring vane airfoil 70. The point $P_2$ is the point (in directions orthogonal to the joint 74) at which the joint 74 is closest to the adjacent suction side S of the other neighboring vane airfoil 70. Thus, the orthogonal distance from $P_1$ to the adjacent pressure side P of the one neighboring vane airfoil 70 is less than the orthogonal distance from the point $P_2$ to the adjacent suction side S of the other neighboring vane airfoil 70. Such a bias avoids breaching the boundary B and can provide a reduction in flow separation.

In a further example, as shown in FIGS. 3A and 3D, the first platform 66 and the second platform 68 generally extend between circumferential sides 80. The circumferential sides 80 can include flanges to facilitate brazing the platforms together, for example. Additionally, the circumferential sides 80 can be situated to facilitate fabrication of the airfoil segments 64. For instance, referring to FIG. 3D, the circumferential sides 80 of the first platform 66 and the second platform 68 are coplanar in a radial direction, as represented by plane PL. For example, the plane PL can be parallel or approximately parallel to the span-wise direction of the vane airfoil 70 extending between the first platform 66 and the second platform 68 or orthogonal to the central engine axis A. The co-planar circumferential sides 80 can be co-machined, thus facilitating fabrication and reducing costs. In other examples, the circumferential sides 80 are not co-planar. As can be appreciated, to be co-planar, the face surface of each circumferential side 80 is flat such that the joints 74/76 are straight (FIG. 2).

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A stator vane assembly comprising:
a plurality of distinct vane segments each respectively including a first platform, a second platform and at least one vane airfoil connected at opposed ends thereof to the first platform and the second platform, the first platforms meeting at distinct first joints with each other and the second platforms meeting at distinct second joints with each other such that the plurality of vane segments form an annular structure, wherein at least the distinct first joints run parallel to a line that is tangent to a leading edge fillet and a trailing edge fillet on a pressure side of the at least one vane airfoil.

2. The assembly as recited in claim 1, wherein the distinct first joints and the distinct second joints include surface discontinuities.

3. The assembly as recited in claim 1, wherein the distinct first joints and the distinct second joints are bonded joints.

4. The assembly as recited in claim 1, wherein each of the distinct first joints extends between neighboring vane airfoils, and at two points that are respectively nearest to the neighboring vane airfoils, the distinct first joint is closer to a pressure side of one of the neighboring vane airfoils than to a suction side of another of the neighboring vane airfoils.

5. The assembly as recited in claim 1, wherein the first platform has a first circumferential side and the second platform has a second circumferential side that is coplanar with the first circumferential side.

6. The assembly as recited in claim 1, wherein between neighboring vane airfoils there is a boundary where a first flow field defined around one of the neighboring vane airfoils meets a second flow field defined around another of the neighboring vane airfoils, and one of the distinct first joints is located between neighboring vane airfoils such that the distinct fist joint does not breach the boundary.

7. The assembly as recited in claim 1, wherein the distinct first joints are straight.

8. The assembly as recited in claim 1, wherein each of the distinct first joints is situated in a linear band between neighboring vane airfoils.

9. The assembly as recited in claim 1, wherein the distinct first joints and the distinct second joints are metallurgical joints.

10. The assembly as recited in claim 1, wherein the distinct first joints and the distinct second joints are bonded joints, each of the distinct first joints extends between neighboring vane airfoils, and at two points that are respectively nearest to the neighboring vane airfoils, the distinct first joint is closer to a pressure side of one of the neighboring vane airfoils than to a suction side of another of the neighboring vane airfoils.

11. The assembly as recited in claim 10, wherein the first platform has a first circumferential side and the second platform has a second circumferential side that is coplanar with the first circumferential side, and between neighboring vane airfoils there is a boundary where a first flow field defined around one of the neighboring vane airfoils meets a second flow field defined around another of the neighboring vane airfoils, and one of the distinct first joints is located between neighboring vane airfoils such that the distinct first joint does not breach the boundary.

12. The assembly as recited in claim 11, wherein the distinct first joints are straight.

13. A gas turbine engine comprising:
a fan;
a compressor section;
a combustor in fluid communication with the compressor section; and
a turbine section in fluid communication with the combustor, the turbine section, the compressor section or both including a stator vane assembly having a plurality of distinct vane segments each respectively including a first platform, a second platform and at least one vane airfoil connected at opposed ends thereof to the first platform and the second platform, the first platforms meeting at distinct first joints with each other and the second platforms meeting at distinct second joints with each other such that the plurality of vane segments form an annular structure, wherein at least the distinct first joints run parallel to a line that is tangent to a leading edge fillet and a trailing edge fillet on a pressure side of the at least one vane airfoil.

14. The gas turbine engine as recited in claim 13, wherein the first platform has a first circumferential side and the second platform has a second circumferential side that is coplanar with the first circumferential side.

15. The assembly as recited in claim 14, wherein between neighboring vane airfoils there is a boundary where a first flow field defined around one of the neighboring vane airfoils meets a second flow field defined around another of the neighboring vane airfoils, one of the distinct first joints is located between neighboring vane airfoils such that the distinct first joint does not breach the boundary, and the distinct first joints are straight.

16. A method for controlling aerodynamic performance of a stator vane assembly, the method comprising:
providing a plurality of distinct vane segments each respectively including a first platform, a second platform and at least one vane airfoil connected at opposed ends thereof to the first platform and the second platform, the first platforms meeting at distinct first joints with each other and the second platforms meeting at distinct second joints with each other such that the plurality of vane segments form an annular structure; and
situating the distinct first joints, the distinct second joints or both in locations between neighboring vane airfoils to reduce gas flow separation compared to at least one other, different location between the neighboring ones of the vane airfoils, including situating each of the distinct first joints such that it runs parallel to a line that is tangent to a leading end fillet and a trailing end fillet on a pressure side of an adjacent one of the vane airfoils.

17. The method as recited in claim 16, including situating each of the distinct first joints between neighboring vane airfoils such that, at two points that are respectively nearest to the neighboring vane airfoils, the distinct first joint is closer to a pressure side of one of the neighboring vane airfoils than to a suction side of another of the neighboring vane airfoils.

18. The method as recited in claim 16, including situating each of the distinct first joints in a linear band between neighboring vane airfoils.

* * * * *